US012711157B2

(12) United States Patent
Morrison et al.

(10) Patent No.: US 12,711,157 B2
(45) Date of Patent: Aug. 18, 2026

(54) RELATIONSHIP REPRESENTATIONS IN A DIGITAL ENVIRONMENT

(71) Applicant: Patently Limited, London (GB)

(72) Inventors: Matthew William Morrison, London (GB); Oliver Kenton Lockett, London (GB); James George Gretton, London (GB); Jerome Spaargaren, London (GB); Matthew Robert Hancocks, London (GB)

(73) Assignee: Patently Limited, London (GB)

( * ) Notice: Subject to any disclaimer, the term of this patent is extended or adjusted under 35 U.S.C. 154(b) by 4 days.

(21) Appl. No.: 18/601,723

(22) Filed: Mar. 11, 2024

(65) Prior Publication Data

US 2024/0303257 A1 Sep. 12, 2024

Related U.S. Application Data

(60) Provisional application No. 63/489,579, filed on Mar. 10, 2023.

(51) Int. Cl.
*G06F 16/28* (2019.01)

(52) U.S. Cl.
CPC .................................. *G06F 16/287* (2019.01)

(58) Field of Classification Search
None
See application file for complete search history.

(56) References Cited

U.S. PATENT DOCUMENTS 9,613,086 B1 * 4/2017 Sherman ............... G06F 16/248
2006/0036568 A1 * 2/2006 Moore .................. G06F 16/168
2009/0216728 A1 * 8/2009 Brainerd ............... G06F 16/248
2010/0287512 A1 * 11/2010 Gan ........................ G06F 16/26 715/854
2016/0148118 A1 * 5/2016 Venkateswarulu .......................... G06F 16/2452 706/12
2017/0316599 A1 * 11/2017 Giunio-Zorkin ...... G06F 16/248

* cited by examiner

*Primary Examiner* — Yu Zhao
(74) *Attorney, Agent, or Firm* — EIP US LLP

(57) ABSTRACT

A method and system for generating data indicative of a relationship representation in a digital environment operating on a user device using a system. A controller receives a request for relationship data associated with given data item in a plurality of data items and obtains at least one other data item of the plurality of data items based on the relationship data associated with the given data item. The controller generates data indicative of the relationship representation, the data indicative of the relationship representation having variable dimensions on a display of the user device. The data includes data representing a first portion comprising a representation of at least the given data item, a second portion comprising a representation of the at least one other data item of the plurality of data items, and an indication of the relationship between the given data item and the at least one other data item of the plurality of data items. The first portion and the second portion are horizontally co-located within a common width and are vertically distributed such that the second portion is positioned above or below the first portion within the dimensions of the data indicative of the relationship representation.

16 Claims, 8 Drawing Sheets

200

210 Receive

220 Obtain

230 Generate

240 Transmit

RELATIONSHIP REPRESENTATIONS IN A DIGITAL ENVIRONMENT

CROSS-REFERENCE TO RELATED APPLICATIONS

This application claims the benefit of U.S. Provisional Application No. 63/489,579, filed Mar. 10, 2023. The above-referenced patent application is incorporated by reference in its entirety.

BACKGROUND

Technical Field

The present invention relates to methods and systems for generating relationship representations in a digital environment. In particular, the generation of a graphical representation indicating the relationship between two or more data items.

Background

The field of data processing has grown rapidly in recent years, with the collection, storage, and analysis of large and complex data sets becoming increasingly important across a wide range of industries. One of the key challenges associated with large and complex data sets is the need to generate meaningful insights from the data, including understanding the relationships between different data items within the data set.

Traditionally, data sets have been represented using charts, graphs, and other visual representations, which can be effective for relatively small and simple complex data sets. However, when dealing with large and complex data sets, these traditional techniques can become difficult to use and interpret, as the number of data items and relationships between them can quickly become overwhelming.

The generation of representations of relationships between data items in a data set can provide useful insights into complex and interconnected data sets. This includes the identification of patterns and relationships within the data that might not be immediately apparent through traditional techniques.

SUMMARY

According to aspects of the present disclosure, there are provided methods, computer program products such as a non-transitory storage medium carrying instructions for carrying out the method, and systems comprising at least a user device, storage and a controller configured to perform the methods.

A first method may be one of generating data indicative of a relationship representation in a digital environment operating on a user device using a system, wherein the system comprises storage for storing data, the data comprising at least a plurality of data items, each of the plurality of data items having associated relationship data indicative of at least one relationship between a given data item of the plurality of data items and at least one other data item of the plurality of data items; and a controller for managing at least some of the plurality of data items in the data.

The first method may include receiving, at the controller, a request, through the API, for the relationship data associated with the given data item in the plurality of data items; obtaining, by the controller, the at least one other data item of the plurality of data items based on the relationship data associated with the given data item; generating, by the controller, the data indicative of the relationship representation, the data indicative of the relationship representation representative of variable dimensions on a display of the user device, and comprising at least a first portion comprising a representation of at least the given data item; a second portion comprising a representation of the at least one other data item of the plurality of data items; and an indication of the relationship between the given data item and the at least one other data item of the plurality of data items, wherein the first portion and the second portion are horizontally co-located within a common width, and are vertically distributed such that the second portion is positioned above or below the first portion within the dimensions of the data indicative of the relationship representation.

A second method may be one of generating data indicative of a relationship representation in a digital environment operating on a user device using a system, wherein the system comprises storage for storing data, the data comprising at least a plurality of data items, each of the plurality of data items having associated relationship data indicative of at least one relationship between a given data item of the plurality of data items and at least one other data item of the plurality of data items; and a controller for managing at least some of the plurality of data items in the data.

The second method may include receiving, at the controller, a request for the relationship data associated with the given data item in the plurality of data items; obtaining, by the controller, the at least one other data item of the plurality of data items based on the relationship data associated with the given data item; generating, by the controller, data indicative of the relationship representation, the data indicative of the relationship representation representative of variable dimensions on a display of the user device, and comprising at least a first portion comprising a representation of at least the given data item; a second portion comprising a representation of the at least one other data item of the plurality of data items; and an indication of the relationship between the given data item and the at least one other data item of the plurality of data items, wherein the first portion and the second portion are configured such that the second portion is positioned adjacent to the first portion within the dimensions of the data indicative of the relationship representation.

The controller may be arranged to manage interactions between the data stored in the storage and requests for data and generate the data indicative of the relationship representation. As such, the controller has a holistic view of the system and therefore acts as an overall manager/arbiter of the configuration of the data indicative of the relationship representation. This configuration includes but is not limited to the layout and size of portions within the data indicative of the relationship representation. By having a holistic view, the controller can efficiently manage and generate the data indicative of the relationship representation based on the characteristics of the user device. Furthermore, by positioning and sizing the first and second portions such that they are within the dimensions of the data indicative of the relationship representation, which in turn is linked to a characteristic of the user device, further efficiencies in the management of the data items within the data can be achieved. The use of a controller having a holistic view of the digital environment, therefore, facilitates the efficient use and management of the available resources, such as processor power, memory and display real-estate. It also provides an effective means for providing representations of at least the given data item and other data items associated with it, as defined in the relationship data, whilst also indicating the relationship.

Optionally, the first portion comprises a plurality of representations, the plurality of representations being indicative of a subset of the plurality of data items of the data. The given data item may also be one of the subsets of the plurality of data items of the data. This facilitates the filtering and searching of the data such that the data indicative of the relationship representation comprises the data item representations which are relevant to the information requested via the user device. Furthermore, by limiting the data item representations in the data indicative of the relationship representation resource usage may be more efficiently managed.

The method may further comprise recalculating, by the controller, a dimension of at least one of the first portion or the second portion, when a request, for the relationship data associated with a chosen data item with a representation in the second portion is received. By recalculating at least one dimension of the first or second portions by the controller, when a request for relationship data associated with an data item in the second portion is received, further portions or data item representations may be added and/or may be resized and/or repositioned efficiently by the controller.

The relationship data may comprise temporal information associated with at least one of the data items. Furthermore, the second portion may be positioned within the dimensions specified in the data indicative of the relationship representation based on the temporal information of the relationship data associated with the given data item and the at least one other data item. This enables the ability to associate temporal information with the given data item, and therefore the data indicative of the relationship representation generated by the controller is capable of accurately reflecting the relationship between the given data item and the at least one other data item.

Optionally, the method may further comprise calculating, by the controller, an end state for at least the first portion and the second portion, the end state comprising an end size and an end position within dimensions specified in the data indicative of the relationship representation; and resizing and repositioning, by the controller, at least the first portion and the second portion to the end size and the end position over a given time period. This enables the controller to control the positioning and sizing of the portions within the data indicative of the relationship representation over a given time. Additionally, by centrally controlling the size and position of the portions, accurate and efficient management of the portions within the data indicative of the relationship representation as well as the available resources, is achieved. This also allows for new data, such as the data associated with the at least one other data item, to be loaded over the given time period such that the data indicative of the relationship representation contains the relevant data without any delay.

The controller may track at least the representation of at least the given data item, and the representation of the at least one other data item of the plurality of data items, within the data indicative of the relationship representation. By tracking the representations of the data items within the data indicative of the relationship representation, the position of each data item representation can be determined such that further efficiencies may be obtained, such as removing the data associated with the data item representation from local memory when it is determined that the data item representation no longer forms part of the data indicative of the relationship representation.

Optionally, the data may comprise any of patent data; product data; personally identifiable information; census data; and sports data. This enables the use of multiple different types of data in the generation of the data indicative of the relationship representation, such that the data may be efficiently managed and relationships between different data items may be efficiently provided to the user device.

Further features and advantages of the invention will become apparent from the following description of preferred embodiments of the invention, given by way of example only, which is made with reference to the accompanying drawings.

DETAILED DESCRIPTION

Large data sets may include vast amounts of structured and unstructured data from a variety of sources. The analysis of such data sets often involves the use of specialized mechanisms and processing capabilities to extract insights, patterns, and relationships from the data. Providing an efficient way to represent relationships between data items in the data set can be processor and power intensive.

Examples of such data sets include census data comprising personally identifiable information which may be used to indicate familial, or other, relationships between people. Here, an individual person can be considered to be a data item in a set of people. Further examples include product data including refinements/iterations of a product's design. In this example, an individual product can be considered to be a data item in a set of products. Yet further examples include intellectual property assets, where individual assets can be considered to be a data item in a set of intellectual property assets.

In the case of intellectual property assets, there are relationships e.g. between patents and/or patent families, between registered designs, and between trademarks. These relationships may be referred to as links. In the case of patents, examples of links include priority links, divisional links, national phase links, re-issue links, re-examination links, validation links, and citation links among others. A priority link may be in the form of a domestic priority claim, or an office-to-office priority claim, i.e., a so-called "Paris Convention" priority claim, which allows priority claims between different countries.

It is desirable to provide methods and systems to enable graphical representation of data items in such data sets on a user device. Representations of these data items may be in the form of cards which contain data associated with, or otherwise identify, the data items. Throughout the description, the term card will generally be used to refer to the graphical representation of the data items (and their associated details), however it will be appreciated that other methods of representing data items may be used. Relationships between the data items in a data set—for example between the cards representing the data items—may be depicted as point to point connections.

Users may access the information contained within the data sets using any suitable user device, including but not limited to a mobile telephone, handheld or laptop device, a desktop computer, a multiprocessor system, a microprocessor-based system, or a programable consumer electronic device comprising appropriate capabilities. As such, it is apparent that the user devices each have their own specific hardware characteristics such as display/screen size and/or processor capability.

Figures 1, 2:
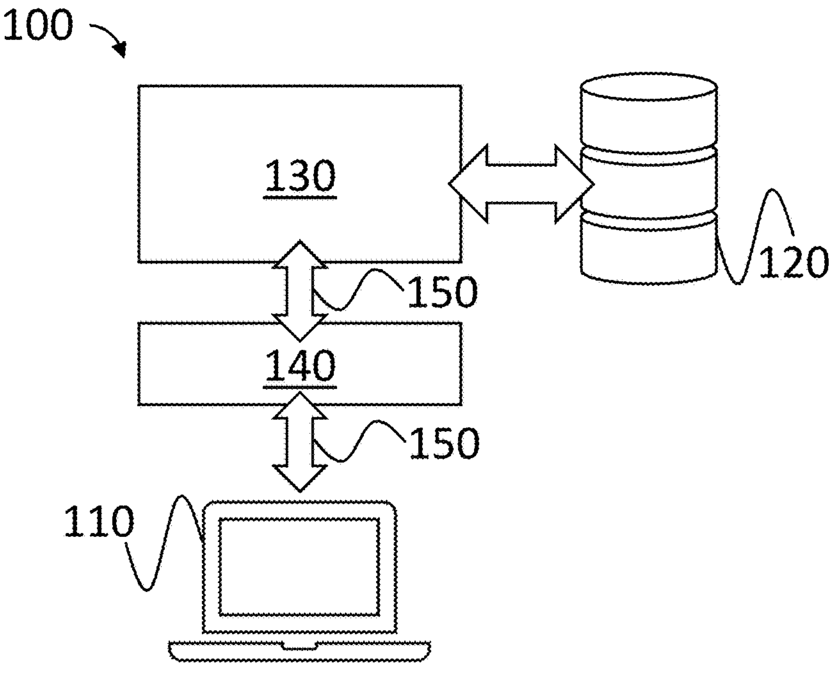
FIG. 1 is a schematic representation of a system for generating data indicative of a relationship representation in a digital environment operating on a user device according to an example.
FIG. 2 is a flowchart showing a method for generating data indicative of a relationship representation in a digital environment operating on a user device according to an example.

FIG. 1 shows schematically a system 100 for graphically depicting relationships between data items on a user device 110 according to an example. The system 100 comprises an application programming interface (API) 140, storage 120, and a controller 130. It will be appreciated that whilst the system 100 is shown comprising a single user device 110, the system 100 may be configured such that multiple user devices have access to the controller 130 and/or storage 120 via the API 140. The controller 130 may be implemented in a remote server. In other examples, the controller 130 may operate as part of a software program or application installed on the user device 110. Whilst the storage 120 is shown as separate from the other resources of the system 100, it will be appreciated that the storage 120 may form part of the controller 130, or may be a virtual component associated with a cloud computing resource. In yet further examples, the storage 120 may be located on an external server. The controller 130, and other components, may be configured within a cloud computing environment.

Services delivered using a cloud computing environment are often referred to as Software as a Service (SaaS). The services are accessed from various user devices through a basic interface, such as a web browser. The API 140 is arranged to send and/or receive one or more commands 150 between the user device 110 and the controller 130. Accordingly, in examples, the user device 110 may access the resources associated with the system 100 via a software program such as a web browser or other application installed on the user device 110 which facilitates the connection to the system 100 via the API 140.

The API 140 supports multiple commands 150 for interacting with resources associated with the system 100, including commands for retrieving data from the storage 120 and generating data indicative of a graphical representation of relationships between retrieved data items based on the characteristics of user interface on the user device 110. Examples of such characteristics include panel or window size, form factor and/or orientation of the user device 110, and/or size of screen of user device 110, whether the user device 110 comprises a foldable display, any changes to display size as a result of folding/unfolding the display.

The controller 130 is configured to generate data indicative of a graphical representation of data items, including relationship (e.g. link) data and provide it to the user device 110 for subsequent processing, such as display on a display associated with the user device 110. When the controller 130 is implemented in a remote server, the data indicative of the graphical representation may be provided through the API 140, and the controller 130 may be part of a cloud computing service, such as AWS. This may allow multiple controller 130 instances to be dynamically instantiated based on requests received from users of a plurality of user devices.

Figure 3A:
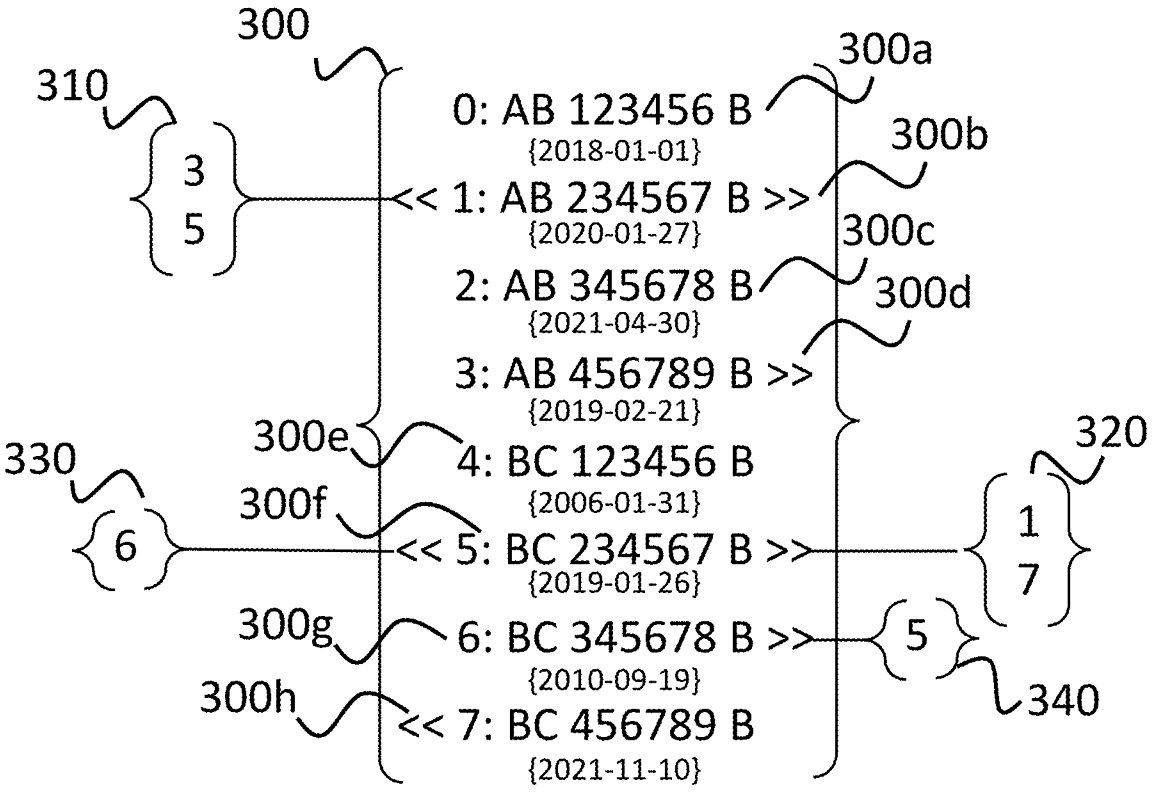
FIG. 3A shows an exemplary data set comprising data items and associated relationship data according to an example.

In one example the storage 120 is configured to store at least the data set, such as data set 300 shown in FIG. 3A. In this example, the data set may be representative of intellectual property assets, and more particularly of patents, such as are maintained by the European Patent Office, World Intellectual Property Office, and the United States Patent Office and the like. In this example the data set 300 comprises a plurality of patent data items 300*a*-300 *h*, some of which have associated relationship data 310, 320 indicative of relationships between at least some of the plurality of data items in the data set, for example, priority links, citation links, as noted above.

A citation link may be for a patent-to-patent backward citation, which is to say the citation link connects a patent that predates a particular patent and has been cited by a patent office as relevant prior art in relation to the particular patent, as indicated by relationship data 310. In another example, the citation link may be for a family-to-family backward citation, which is to say the citation link connects a family of patents that contains one patent, where that patent predates a particular patent in a different patent family and has been cited by a patent office as relevant prior art in relation to the particular patent, causing there to be a link between the respective patent families. In the example of FIG. 3A, data item 1, 300*b*, has a date of Jan. 27, 2020, and the relationship data 310 indicates data item 3, 300*d* which has a date of Feb. 21, 2019, and data item 5, 300*f* which has a date of Jan. 26, 2019. Both data items 3 and 5 predate data item 1 and consequently the relationship data includes backward citation links from data item 1 to data items 3 and 5.

Alternatively, a citation link may be for a patent-to-patent forward citation, as indicated by relationship data 320. In another example, the citation link may be for a family-to-family forward citation.

In some examples, data items, such as data item 5, 300*f* which has a date of Jan. 26, 2019, has both forward and backwards citation links: the relationship data 320 indicates data item 1, 300*b* which has a date of Jan. 27, 2020, and data item 7, 300*h*, which has a date of Nov. 10, 2021. Both data items 1 and 7 postdate data item 5, and consequently the relationship data 320 includes forward citation links from data item 5 to data items 1 and 7. In addition, there is relationship data 330 for data item 5, 300*f*. This indicates data item 6, 300*g* which has a date of Sep. 19, 2010, and predates data item 5; consequently, the relationship data additionally includes a backward citation link from data item 5 to data item 6.

Other information may also be associated with each data item. For example, where each data item represents a patent, in addition to relationship (e.g. link) data there may be associated metadata in the form of publication numbers, abstract data, titles, inventor name(s), and applicant name(s).

This metadata may be used when constructing a graphical representation of the data items.

In one example, the controller 130 is configured to perform the method of FIG. 2, for a set of data items in a data set, such as data set 300 in FIG. 3A. At step 210, a request is received at the controller 130 and from a user device 110, such as a desktop computer, mobile telephone, or tablet computer for relationship data associated with a given data item in the plurality of data items of the data set stored in the storage, such as storage 120 of system 100 described in FIG. 1.

The request may be initiated via user interaction with the user device 110, such as via an external peripheral (not shown) connected to the user device, such as a mouse or keyboard, or via built-in peripherals (not shown) such as touch screen controllers and/or trackpads. The request may be an initial request for a data item. The request may be for metadata or relationship data relating to a rendered (thus previously requested) data item, for example in response to user interaction with an already displayed graphical representation of a data item. For example, a user may interact with a user interface element rendered within the graphical representation. The user interface element may correspond to data item 1, 300*b*, in the data set 300. In response to the user interaction, a request for relationship data and/or other metadata 310 corresponding to data item 1, 300*b*, may be sent. The request, shown as command 150 in FIG. 1, may be received through the API 140.

At step 220, following receipt of the request for relationship data at the controller 130, a request to the storage 120 for relationship data and/or other metadata 310 corresponding to data item 1, 300*b* is sent by the controller 130. This may involve use of an API, which may or may not be different from the API 140 described above. The relationship data and/or other metadata 310 corresponding to the requested data item, such as data item 1, 300*b*, may be compressed or otherwise pre-processed to reduce the size of the data and/or increase the efficiency of its transmission to the controller 130 from the storage 120. Improving the efficiency of the transmission of the data from the storage 120 to the controller 130 is particularly useful when the storage 120 is remote from the controller 130 and is accessed over a network, such as the Internet. It is also beneficial when the controller 130 operates on the user device 110.

The pre-processing may also involve a determination of other data items within the data set that are related to the requested data item, such as data item 1, 300*b*. For example, a number of related data items may be stored in a record associated with the requested data item such as data item 1, 300*b*. In addition, at least some of the data items within the data set may be indexed for example using identifiers. The use of identifiers facilitates efficient searching, by the controller 130, of the data set to obtain data items that are related to the requested data item such as data item 1, 300*b*.

An exemplary such index is shown in FIG. 3A, where each data item 300*a*-300*h* of the data set 300 has an associated identifier (which for the sake of illustration is shown as index numbers 0, 1, 2 . . . 7 however the identifiers will typically be globally unique identities such as 10-, or more-, digit numbers). By allocating each data item 300*a*-300*h* an identifier, the relationship data 310, 320, 330, 340 may be referenced by identifiers. In some examples, the identifiers (0, 1, 2 . . . 7) may be stored in a separate database such as an SQL database. The separate database may be accessible by the controller using its own API, different from the API 140 used to pass commands 150 between the user device 110 and the controller 130.

In the current example, the controller 130 can determine from the relationship data 310 and identifiers that data items 3 and 5 (300*d*, 300*f*) are related to the requested data item such as data item 1, 300*b*. Because data item 5, 300*f*, is related to data items 6 and 7 (300*g*, 300*h*)—in addition to data item 1—the controller 130 also receives relationship data 310, 320, 330 for data items 300*b*, 300*d*, 300*f*, 300*g* and 300*h*.

Figure 3B:
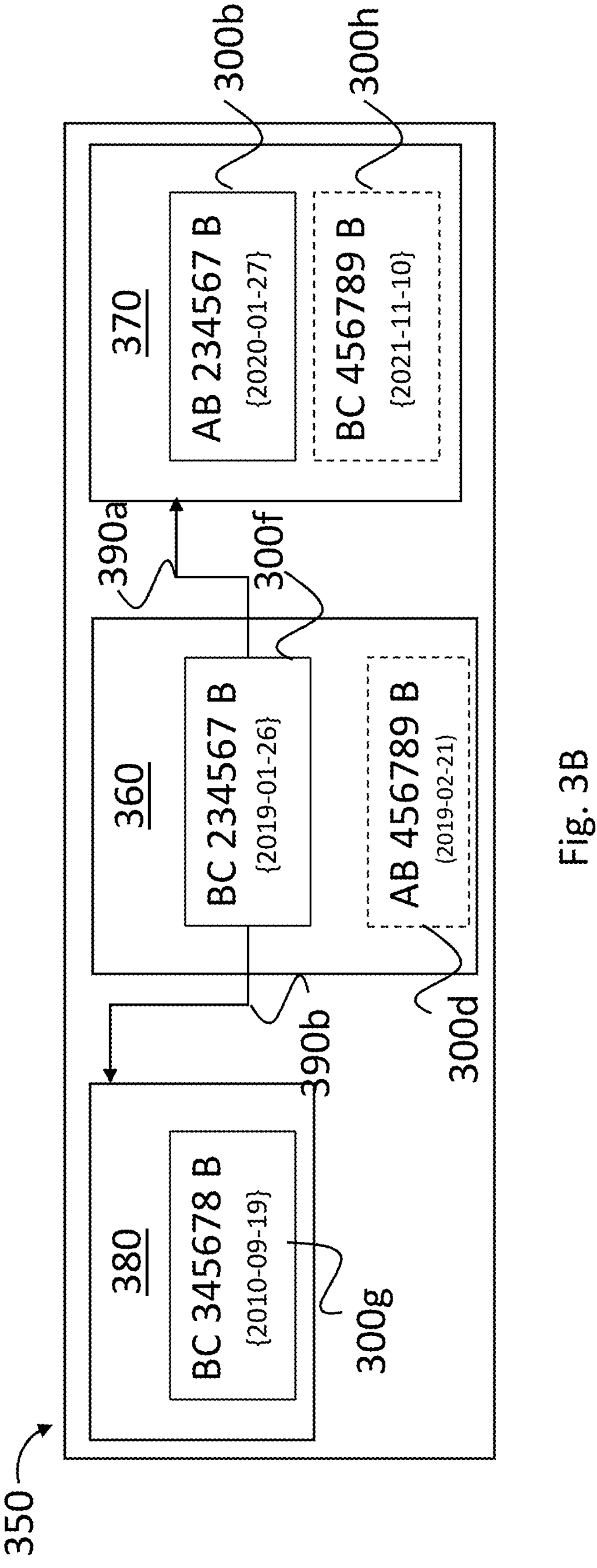
FIG. 3B shows schematically a rendered relationship representation based on the data set shown in FIG. 3A.

At step 230, the controller 130 proceeds to generate the data needed for a user device to render a graphical relationship depicting relationships between these data items. This involves taking account of the panel or window size and/or form factor and/or orientation of the display of the user device 110, as discussed above and generating a graphical relationship such as the exemplary rendered relationship representation 350 shown in FIG. 3B based on data set 300 of FIG. 3A.

Then, at step 240 the generated relationship representation 350 is transmitted to the user device 110, through the API 140. In examples where the data indicative of the relationship representation 350 comprises instructions to render a visual representation of the data items in the data set and the relationships between them, following receipt of the data, the user device 110 may render the relationship representation and display the rendered relationship representation on the display of the user device 110.

In this example, the graphical representation 350 comprises a first portion 360 comprising cards representing data item 3, 300*d*, and data item 5, 300*f* and a second portion 370 comprising cards representing data item 1, 300*b*, and data item 7, 300*h*. In this representation 350 the first portion 360 encompasses cards representing data items that predate cards representing data items in the second portion 370. The card representing data item 6, 300*g* is depicted in further portion 380, and pre-dates cards representing data items in the first portion 360. The representation 350 also comprises an indication 390*a*, in the form of an arrow rendered as part of the relationship representation 350, showing the relationship between the card of data item 5, 300*f* and the card of data item 1 300*b*, and an indication 390*b*, showing the relationship between the card of data item 5, 300*f* and the card of data item 6, 300*g*.

Generally, the graphical representation may comprise a plurality of portions, each comprising one or more cards representing respective data items. Each portion may be positioned adjacent another portion such that e.g. cards rendered in a first portion that is to the left of a second portion predate the cards rendered in the second portion. Alternatively, each portion may be positioned above another portion, such that e.g. cards rendered in a first portion that is above a second portion predate the cards rendered in the second portion. Whether the portions are rendered side by side or above and below may be determined by the form factor of the user device 110, for example, a size of a visual display unit associated with the user device, processor capabilities, and/or memory limitations.

Figure 4:
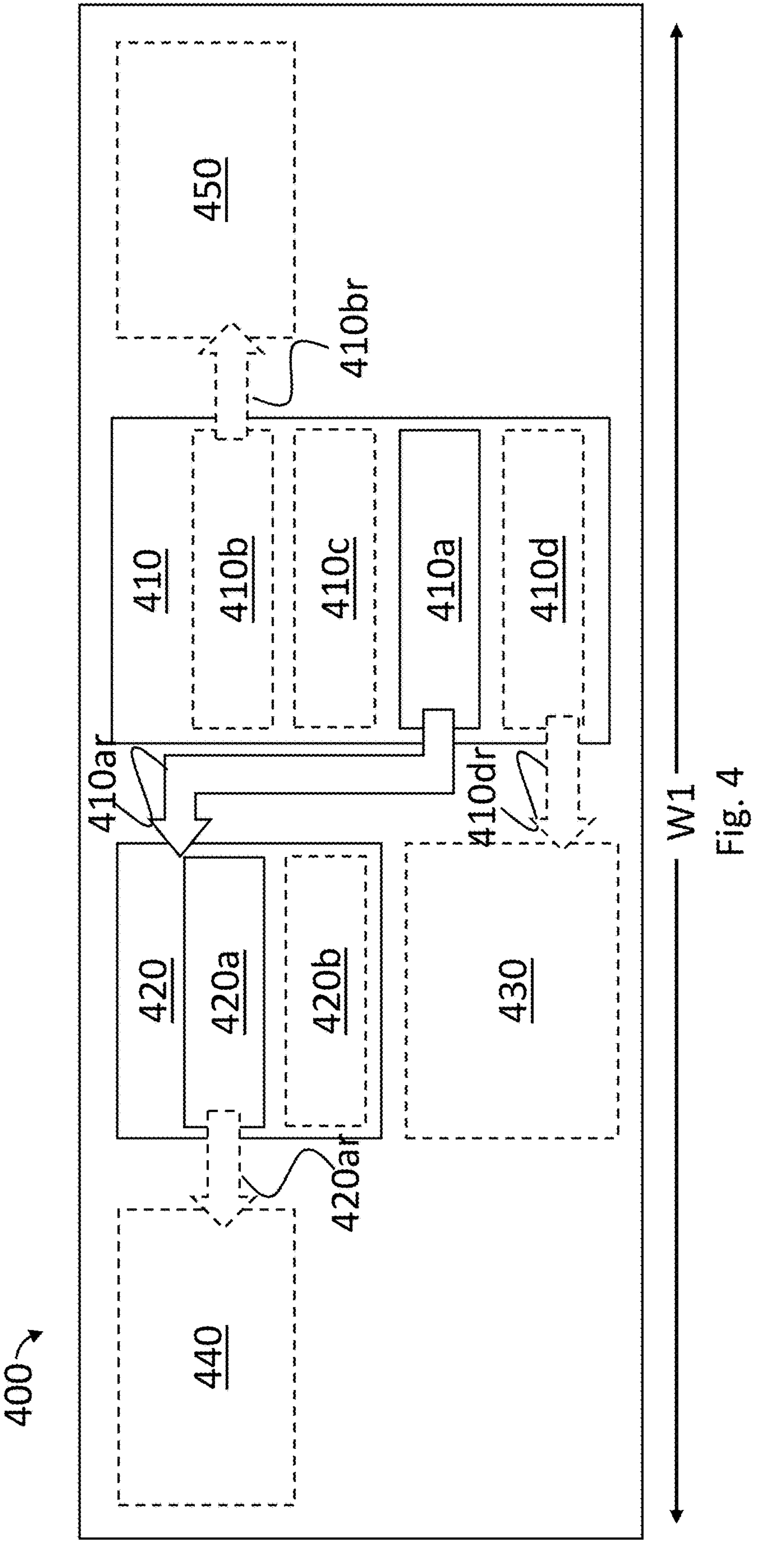
FIG. 4 shows schematically data indicative of a relationship representation according to a first example.
Figure 5A:
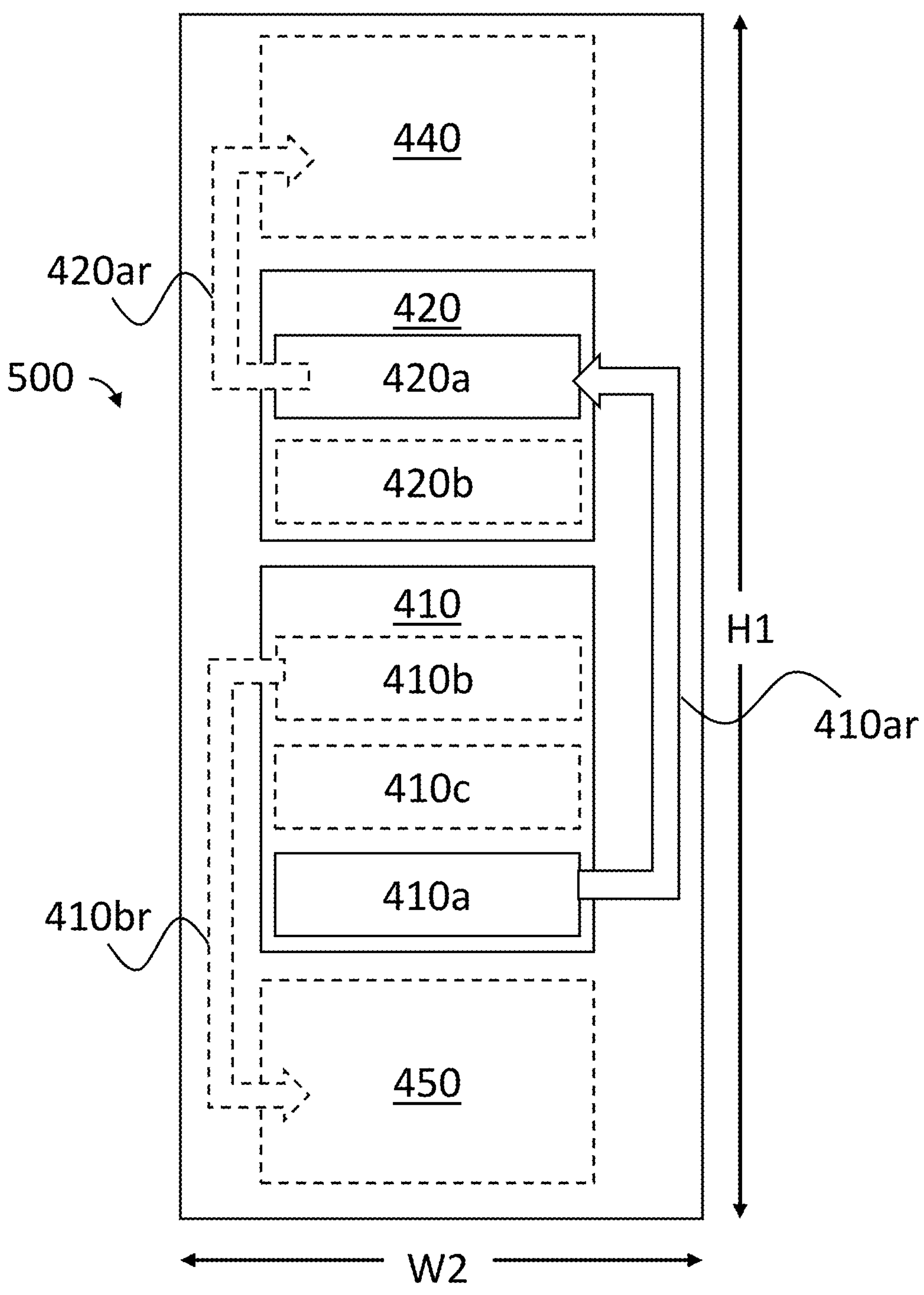
FIG. 5A shows schematically data indicative of a relationship representation according to a second example.

Referring to FIG. 4, a width W1 of a display panel or window associated with a user device 110 may be sent to the controller 130, causing the controller 130 to generate the graphical representation 400 comprising adjacent portions 410, 420, 440, 450. Referring to FIG. 5A, a different width W2 of a display panel or window associated with a user device 110 may cause the controller 130 to generate the graphical representation 500 comprising vertically arranged portions 410, 420, 440, 450.

The controller 130 may be configured to detect changes in panel or window size and/or form factor and/or orientation and adjust the data indicative of the relationship representation 400, 500 appropriately. One example of such a change includes the rotation of a handheld user device 110, which affects the dimensions of the relationship representation 400, 500. For example, if the relationship representation initially specified a width W1 and thereafter a user device 110 is rotated, the width of the display—such as it is viewed by the user of device 110—will change. The user device 110 may indicate that the relevant width has changed to W2.

The controller 130 may calculate the extents of the relationship representation 400, 500. The list-containing portions, referred to herein as panels, containing list item portions, referred to herein as cards, such as first panel 410 and second panel 420, may then be resized to fit within the extents. It will be appreciated that the graphical representation 400, 500 comprises at least two panels 410, 420, but may comprise a variable number of panels, for example additionally panels 430, 440, 450. The first panel 410 comprises at least card 410*a* representing a data item in the data set. The card 410*a* represents one of the data items within the data set for which relationship data was requested at step 210. In this example the relationship data depicts a link 410*ar* to the data item represented by card 420*a* positioned in panel 420, because the user has clicked on the card 410*a*. In this example the link 410*ar* indicates that the data item represented by card 420*a* predates the data item represented by card 410*a*.

The cards 410*a*, 410*b*, 410*c*, 410*d* represent other data items within the data set for which relationship data was requested. For example, a search and/or filter may have been used to define the request sent to the controller 130 at step 210, which, when sent to the storage 120, resulted in a plurality of data items being returned to the controller 130, preferably with their respective relationship data. This plurality of data items that are returned to the controller 130 may be referred to as a subset of the set of data items.

In some examples, the data needed to render cards 410*a*, 410*b*, 410*c*, 410*d* associated with the data items in the subset may be preloaded or fetched such that the graphical representations can be generated more efficiently and with minimal delay from the user's perspective. In examples where the first panel 410 is of a size that is smaller than the collective size of the representations of at least some of the data items whose cards are to be rendered in the first panel 410, the preloading or fetching of the data needed to render such cards means that those that are not currently displayed in the first panel 410 can be rendered without delay as the user interacts with the device, e.g., as a user scrolls down the list of cards that are displayed. Furthermore, as described above, responsive to a change of viewing orientation, the data indicative of the relationship representation 400, 500 may be updated. This may result in cards no longer being rendered for display in the first panel 410 (or the second panel 420, or other panel 430, 450, 460) without subsequent user interaction, e.g., where a change in the orientation of the user device 110, or the folding or unfolding of a foldable display associated with the user device 110, results in the updating of the data indicative of the relationship representation 400, 500 such that the size of the first panel 410 (or any of the other panels 420, 430, 440, 450) is configured to be smaller than before the update. This may result in at least some of the cards no longer being displayed in the first panel 410. For example, the height of the first panel 410 may be reduced such that card 410*d* is no longer displayed in the first panel 410.

If relationship data has been requested for a specific data item, the card corresponding to that data item such as card 410*a* be rendered for display in the first panel 410 even after the user interaction results in the provision of further cards e.g., as a user scrolls down through the cards. In such a case this card 410*a* may be maintained as part of the first panel 410 (such as being fixed at a given position in the first panel 410) even when other cards that have previously been rendered for display are removed from the first panel 410.

When a particular card is no longer rendered within the first panel 410, the data associated with that card may be discarded from a local memory associated with either the controller 130 and/or the user device 110. This facilitates the efficient management of the available resources.

In some examples, the data indicative of the relationship representation 400 may comprise a third panel 430, or any number of other panels, 440, 450. The other panels may be based on the relationship data associated with another data item in the data set represented as a card in the first panel 410, such as the card shown by card 410*d*. The third panel 430 may be used to provide cards (not shown) of data items related to the other data item in the data set (as shown by card 410*d*) in much the same way as the second panel 420 encompasses cards 420*a*, 420*b* related to card 410*a* that is rendered in the first panel 410. In addition to the first panel 410 and the second panel 420 (and other panels 430, 440, 450), the data indicative of the relationship representation 400, 500 may also comprise indications 410*ar*, 410*br*, 410*dr*, 420*ar* of the relationship between the cards in the panels 410, 420, 430, 440, 450, and the cards in other panels. In some examples, such as the example described above in relation to a third panel 430, there may be a more than one indication 410*ar*, 410*br*, 410*dr*, 420*ar* provided as part of the relationship representation 400 to indicate different relationships between the data items represented by the cards. Whilst the indications 410*ar*, 410*br*, 410*dr*, 420*ar* are shown as arrows in the examples of FIG. 4 and FIG. 5A, it will be appreciated that other means of indicating the relationship between cards of the panels 410, 420, 430, 440, 450 may be used, such as colour, text size or style, and/or iconography.

As described above, the dimensions of the relationship representation 400, 500 may be generated based on at least one characteristic of the user device 110, such as a display size or processing capability.

Whilst the example data indicative of the relationship representation 400 specifies that the first 410, second 420 and fourth and fifth 440, 450, panels are positioned in four side-by-side, horizontally distributed columns, it will be appreciated that the panels 410, 420, 440, 450 may be positioned in any number of side-by-side horizontally distributed columns as required and as dictated by the dimensions of the relationship representation 400 such as a display, or window, width W1.

The temporal relationships which the arrangement of the panels represent may be one of preceding and later in time. For example, second panel 420 may contain cards that represent data items that precede in time, i.e. have an earlier date, than the data item represented by the card 410*a* in the first panel 410 to which they are linked. For example, fourth panel 440 may contain cards that represent data items that precede in time, i.e. have an earlier date, than the data item represented by card 420*a* in the second panel 420 to which they are linked. For example, fifth panel 450 may contain cards that represent data items that are later in time, i.e. have a later date, than the data item represented by card 410*a* in the first panel 410 to which they are linked.

A third exemplary panel 430, representing a set of data items having a similar temporal relationship to a data item represented by a card 410*d* to that which data items in the second exemplary panel 420 have to a data item represented by another given card 410*a* in the same panel 410. For example, panel 420 may represent data that precede in time, i.e. have an earlier date, than the data item represented by card 410*a* in the first panel 410 to which they are linked. Similarly, panel 430, which appears in the same column and is vertically distributed with respect to panel 420, may represent data items that precede in time, i.e. have an earlier date than, the data item represented by card 410*d* in the first panel 410 to which they are linked. A single data item represented by a card in any of the panels, may be linked to a set of cards/panel to one side, representing a particular temporality of relationship, such as a forward temporality relationship, and may also be linked to a set of cards/panel to the other side, having the opposite temporality of relationship, such as a backward temporality relationship.

Sets of cards may be collapsed so that a single card, is shown on top of a set of cards and in that case, a panel may exhibit a reduced vertical dimension, a similar vertical dimension to that of a card. The card itself may also be reduced in height in order to accommodate more stacking of panels/sets of cards as required within a single column.

Referring to FIG. 5A, in a second example, the data indicative of the relationship representation 500 specifies that the first panel 410 and the second panel are 420 are horizontally co-located within a single column, thus spanning a common width W2, and are vertically distributed such that the second panel 420 is positioned above or below the first panel 410. The positioning of the second panel 420 above or below the first panel 410 may also be based on temporal information associated with the relationship data requested in step 210 in a similar manner as described above in relation to FIG. 3B and FIG. 4. For example, where the second panel 420 encompasses cards corresponding to data items which have an associated date which predates the date associated with the given data item, the first panel 410 may be positioned above the second panel 420 in the rendered relationship representation 500. Conversely, where another panel, such as panel 450, comprises cards representing data items which have an associated date post-dating the date of the data item represented by the selected card (e.g., card 410*b*), the other panel 450 may be positioned below the first panel 410 in the rendered relationship representation 500. As described above with reference to FIG. 4, in some examples, a card 420*a* in the second panel 420 may be selected in the user interface, causing the user device to request and obtain relationship data. In the example representation 500 shown in FIG. 5A, if the data items associated with that obtained relationship data comprises data items which predate the data item corresponding to the selected card 420*a*, then another panel 440 may be rendered and comprise cards representing those predating data items. The other panel 440 may be rendered above the second panel 420. It will be appreciated that positioning cards representing data items which predate the selected data item in a panel 440 above that of the selected card, and positioning cards representing data items which postdate the selected data item in a panel below the selected card's panel, is possible, and that the spatial ordering can be reversed. Other arrangements and/or representations are also possible. The second panel may in any case be positioned within the dimensions specified in the data indicative of the relationship representation based on the temporal information of the relationship data associated with the given data item and the at least one other data item.

Whilst the example data indicative of the relationship representation 500 specifies that the first 410, second 420, and other 440, 450 panels are positioned in four vertically-distributed sections, it will be appreciated that the panels 410, 420, 440, 450 may be positioned in any number of vertically-distributed sections as required, and on the basis of at least the dimensions specified in the data indicative of the relationship representation 500 such as an available window height H1 and/or panel width W2. The panels may be vertically redistributed in an animation by a UI controller responsible for calculating an end state for at least the first panel and the second panel, the end state comprising an end size and an end position within dimensions specified in the data indicative of the relationship representation. The controller can be responsible for resizing and repositioning at least the first panel and the second panel to the end size and the end position over a given time period during which the animation occurs. The controller may also track at least the representation of at least the given data item, and the representation of the at least one other data item of the plurality of data items, within the data indicative of the relationship representation.

Figure 5B:
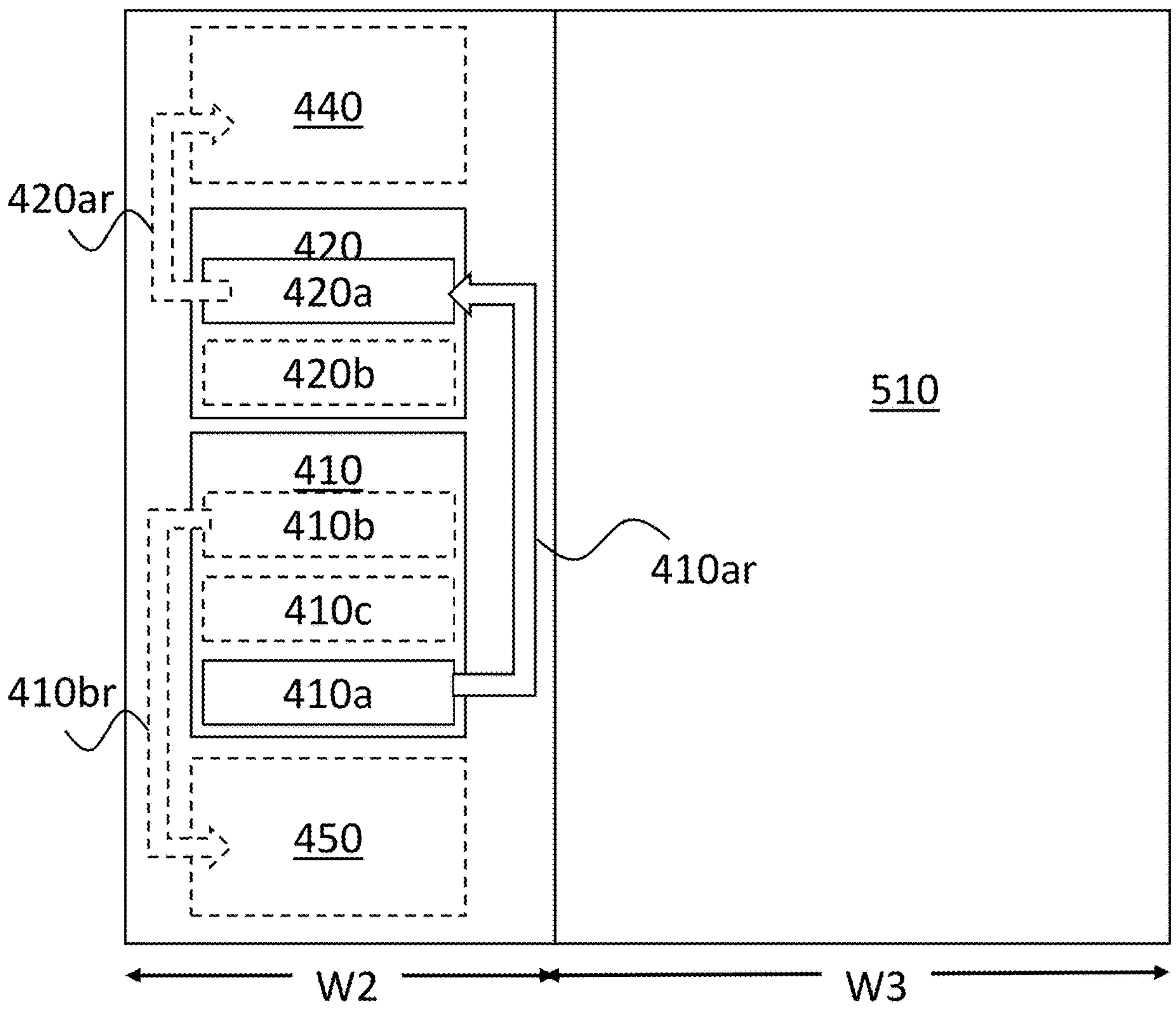
FIG. 5B shows schematically data indicative of the relationship representation of the second example alongside a further panel.

In examples, and referring to FIG. 5B, when the available display width for displaying the list items is reduced, for example, due to a further panel 510 being opened on the display, the first panel 410 and the second panel 420 are moved, preferably by means of a smooth animated transition, from being in an arrangement such as that shown in FIG. 4, in which the panels are horizontally distributed such that the first panel 410 and the second panel 420 are positioned in a side-by-side arrangement, to being in an arrangement such as that shown in FIG. 5A, in which the respective panels are horizontally co-located within a common width W2, and are vertically distributed such that the second panel 420 is positioned above or below the first panel 410.

Triggers for opening further panel 510 include the selection of a card, such as card 420*a* from the arrangement shown in FIG. 4—in which card 420*a* is positioned within portion 420, alongside portions 410 and optionally portion 440—using a user interface device, such as a mouse, keyboard, and/or touch screen. It will be appreciated that any number of different user interface devices may be used to trigger the opening of the further panel 510 on interaction by selection of a card 420*a* or other element displayed in the relationship representation 400.

Figure 5C:
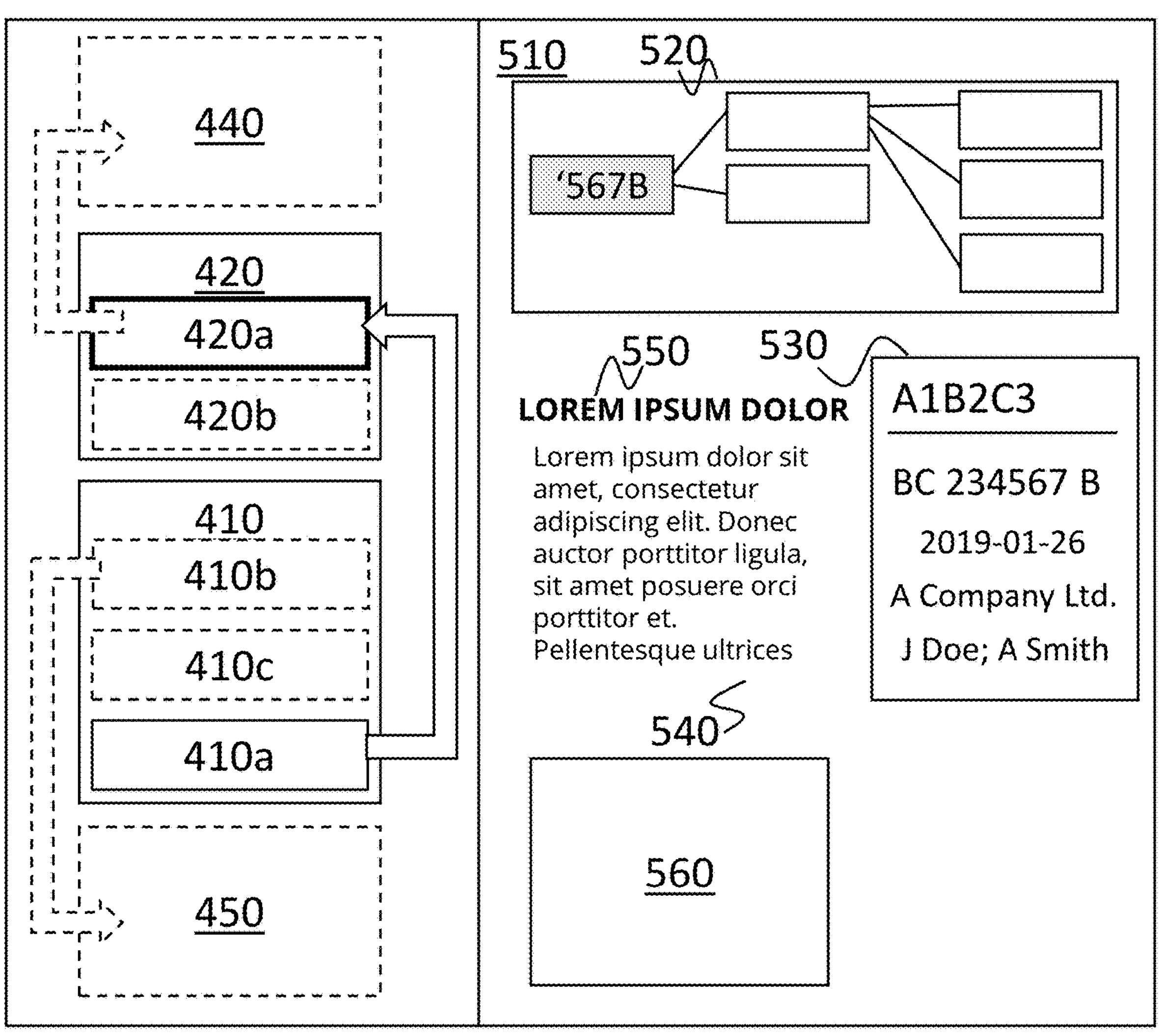
FIG. 5C shows schematically data indicative of the relationship representation of the second example, alongside data indicative of a selected card in a further panel

FIG. 5C shows an example of data included in the further panel 510. As described above, information associated with a data item, such as a data item stored in the data set 300 described above in relation to FIG. 3A may be rendered and displayed as part of the further panel 510. For example, where the data items in the data set 300 represent patent data, metadata associated with a patent and/or patent application, including patent family information, may be displayed in the further panel 510.

The further panel 510 may comprise or otherwise depict a graphical representation 520 based on the metadata associated with the data item or items of the selected card 420*a*. The graphical representation 520 may depict patent family data associated with the data item of the selected card 420*a*, such that the graphical representation 520 provides a visual indication of priority links between family members in the patent family data.

The further panel 510 may also comprise additional metadata associated with the data item of the selected card 420*a*, and may group the metadata into separate sub-panels, such as sub-panel 530 within the further panel 510. In one example, the sub-panel 530 may comprise a reference number, a representative patent application and/or publication number for the family, priority information, applicant name (s), and inventor name(s) amongst other metadata associated with the data item or items of the selected card 420*a*. The further panel 510 may also comprise an area for displaying other relevant information such as abstract data 540, an application title 550, and at least one patent drawing/figure 560 of the representative patent application for the family. It will be appreciated that other metadata associated with the data item of the selected card 420*a* could also be displayed in the further panel 510.

The data within the further panel 510 may also be adjusted and/or altered based on further user interaction with items presented in the further panel 510. For example, where a user interacts with a particular user interface element depicting a related patent/patent application in the graphical representation 520 such as the user interface element labelled with patent having identifier '567B, the metadata associated with the selected data item, namely the metadata for patent '567B, may be displayed within the further panel 510.

It will be appreciated that, whilst the examples described above refer to relationship data between two data items in the form of links, and where there is an ordering between the respective data items based on temporal data characteristics of the data items, the relationship data may be based on non-temporal characteristics.

Figure 6:
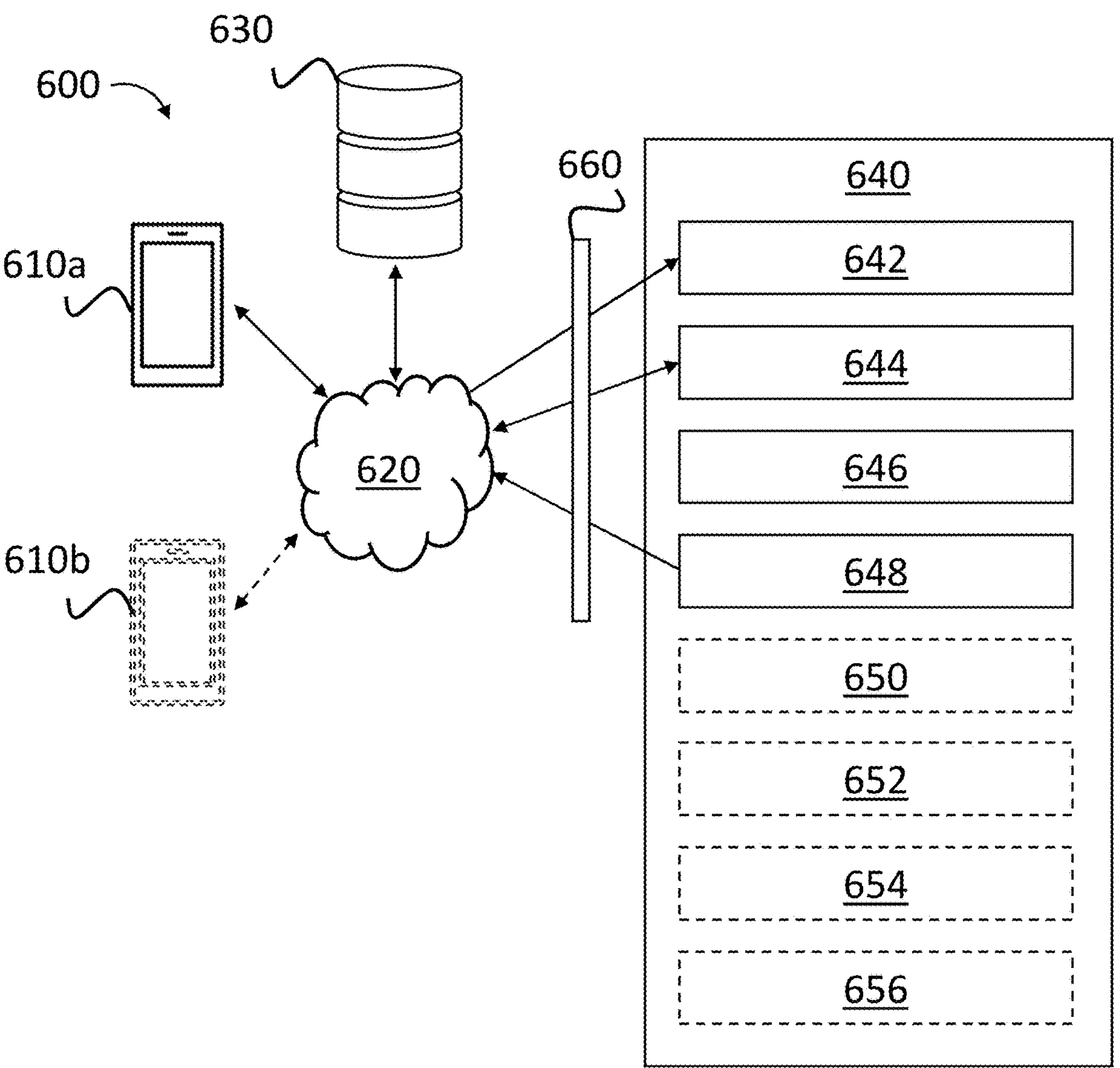
FIG. 6 shows a system for generating data indicative of a relationship representation in a digital environment according to an example.

FIG. 6 shows a system 600 comprising at least one user device 610*a*, 610*b* configured to receive relationship representations generated by the controller 640 according to an embodiment. The at least one user device 610*a*, 610*b* can be a mobile telephone, hand-held or laptop device, a desktop computer, a multiprocessor system, a microprocessor-based system, or a programable consumer electronic device comprising appropriate transmitting and/or receiving capabilities. To facilitate the transmission and/or receiving capabilities, the user device 610*a*, 610*b*, may comprise a network adaptor (not shown) that is arranged to facilitate communication with any number of remote resources via a network 620 such as a local area network (LAN), a general wide area network (WAN), and/or a public network (e.g., the Internet). The network adaptor may be configured to communicate using either a wired or wireless communication method, such as cellular connectivity (LTE, 3G, 4G, or 5G), ethernet, or over a Wi-Fi network.

The system 600 also comprises a storage system 630 having storage for storing at least the data set comprising a plurality of data items each having associated relationship data indicative of relationships between at least some of the plurality of data items. The relationship data may be representative of a temporal link between the data items. The storage of the storage system 630 may be a solid-state drive (SSD) or other semiconductor-based RAM; a ROM, for example, a CD ROM or a semiconductor ROM; a magnetic recording medium, for example, a floppy disk or hard disk; optical memory devices in general, although it will be appreciated that other storage mediums may be used. The storage system 630 may be accessed via a local area LAN, a WAN, and/or a public network (e.g., the Internet) via the network adaptor. Whilst the storage system 630 is shown as separate from the other resources of the system 600, it will be appreciated that the storage system 630 may form part of a remote server (not shown) configured to operate the controller 640, another server, or may be a virtual component associated with a cloud computing implementation of the system 600.

The system 600 also comprises a controller 640 for managing at least some of the plurality of data items in the data and is configured to send and receive commands to and from the user device 610*a*, 610*b* through an API 660. The controller 640 may form part of a remote server (not shown) which may be implemented in hardware, or may be on an AWS server, or on another server provided by a cloud services provider. Furthermore, multiple remote servers may be used, each being provided by separate cloud computing service providers to provide the service required to implement method 200 described above. The controller 640 may be configured on the same network 620 as the user device 610*a*, 610*b* or may be accessed via an external network such as the Internet.

The controller 640 comprises a number of modules 642, 644, 646, 648, 650, 652, 654, 656 arranged to implement method 200 described above. It will be appreciated that not all modules are required and that some may be optional, as indicated by the modules 650, 652, 654, 656 having dotted outlines. These modules 642, 644, 646, 648, 650, 652, 654, 656 may be hardware-implemented or software-implemented and may be configured to implement at least some of the steps described above with reference to method 200.

In particular, the controller 640 may comprise, or form part of a processor (not shown) configured to undertake the processing and/or pre-processing of the data items in the data set. Examples of the pre-processing include the determination of other characteristics of data items within the data set based on an analysis of the data items themselves. For example, the number of related data items may be stored in an associated record with the data item, such that the related data items, based on the relationship data, may be quickly and efficiently obtained. The efficiency may be improved further by assigning each data item within the data set an identifier which may be stored alongside the data item in the storage 630, or in a separate database, such as an SQL database. The other database may be accessible by the controller using its own API, different from the API 660 used to pass commands between the user device 610*a*, 610*b* and the controller 640. The controller 640 comprises an input module 642 for receiving, through the API 660, a request for relationship data associated with a given data item of the plurality of data items in the data set. The request for the relationship data may be received from a user device 610*a*, over the network 620. The request for relationship data may be in response to an input received from a user via an input device associated with the user device 610*a*, 610*b*, such as a touch screen, speech instruction, mouse or keyboard, or in response to a query performed by a user. The input module 642 receives, through the API 660 the relationship data associated with the given data item. As described above, the relationship data may be received from the storage 630, or from another database, such as the SQL database.

The controller 640 also comprises a retrieving module 644 for obtaining at least one other data item of the plurality of data items based on the received relationship data. The data items are received from the data set stored in the storage 630. In the example described above, where each data item is assigned an identifier, such as a unique number or index, the data set may be efficiently searched by the controller 660 using that identifier. The unique number or index may form part of the relationship data such that references to related data items in the data set are identified using the identifier. As such, the data set may be quickly and efficiently searched by making an API call, to obtain the list of related data items based on the relationship data. The data item's data received in response to the request may be structured data in various formats, including but not limited to comma separate values, eXtensible Mark-up Language (XML), JavaScript Object Notation (JSON), or any other suitable format.

Once data has been obtained from the storage 630 for a data item, a generation module 646 generates data indicative of the relationship representation, such as the data indicative of the relationship representation 350, 400, 500. The data indicative of the relationship representation may be generated in any suitable format. In some examples, the generated data indicative of the relationship representation may be Hypertext Mark-up Language 5 (HTML 5) and may be generated based on a set of rules and/or templates. The generated data may include various interactive elements, such as filters, search boxes, and sorting options, as well as other user interface elements to be rendered in a software program on the user device 610*a*, 610*b*.

The data indicative of the relationship representation 350, 400, 500 generated by the generation module 646 is based on a form factor and/or orientation associated with the user device 610*a*, 610*b*. Other relevant characteristics may include processor capabilities, and/or memory limitations. In the example relationship representation 400, a width of a display associated with a user device 610*a*, 610*b* configured to receive the relationship representation 400 from the controller, may be used to determine the width W1 of the relationship representation 400.

The data indicative of the relationship representation 350, 400, 500 generated by the generation module 646 comprises at least two portions. A first portion, such as panel 410 shown in FIGS. 4 and 5A comprises at least one card 410*a*. It will be appreciated that the first panel may also comprise other cards. The given card represents the data item in the data set for which the request for relationship data was received by the input module 642. The data indicative of the relationship representation 400, 500 may also comprise a second portion, such as portion 420 comprising at least one card 420*a* of a data item within the data set. It will be appreciated that the second panel 420 may comprise other cards.

In addition to the first panel, the second panel, and other panels 440, 450, the data indicative of the relationship representation 400, 500 also comprises indications, such as indication 410*ar*, 410*br*, 410*dr*, and 420*ar* shown schematically in FIGS. 4 and 5A. The indications are representative of the relationship between the data items represented by the cards (e.g., 410*a*, 410*b*, 410*d*, and 420*a*). Whilst the indications 390*a*, 390*b*, 410*ar*, 410*br*, 410*dr*, and 420*ar* in FIGS. 3B, 4, 5A, 5B, and 5C are shown rendered as arrows, it will be appreciated that other means of indicating the relationship between data items of the first portion and the second portion may be used, such as colour, text size or style, and/or iconography.

The controller 640 also comprises a transmission module 648 for transmitting the generated data indicative of the relationship representation to the user device 610*a*, 610*b* through the API 660. The transmission of the data indicative of the relationship representation from the controller 640 to the user device 610*a*, 610*b* may be over the network 620. Continuing the example described above, where the data indicative of the relationship representation is HTML 5 data, a software application operating on the user device 610*a*, 610*b*, such as a web browser will analyse the HTML 5 data to identify its structure and contents, including identifying the relevant HTML tags and attributes used to define it. The software program will then transform the HTML 5 data into a Document Object Model (DOM) which represents the structure and content and is used by the software program to render the relationship representation, including the rendering of various elements including text, images, and multimedia content. The rendered content may then be displayed to a user, such as on a visual display unit associated with the user device. User interactions are then able to be processed by the software program in accordance with the actions specified in the HTML5 data. This allows the dynamic updating of the relationship representation based on the user interactions to be quickly and efficiently rendered and any updates displayed to the user.

In addition to the above components, the controller 640 may also comprise a recalculation module 650. The recalculation module is configured to recalculate at least one dimension of the portion(s) when the request for the relationship data is received through the API. The recalculation module 650 facilitates the adjustment of the relationship representation 400, for example to the relationship representation 500, whereby a width of the rendered relationship representation (as specified in the generated data indicative of the relationship representation) is reduced to reflect the change in the width of the display associated with the user device 610*a*, 610*b*. It will be appreciated that the recalculation module 650 may adjust the dimensions of a portion based on any number of different characteristics associated with the user device and/or the cards being provided as part of the data indicative of the relationship representation.

In addition to the recalculation module 650, the controller 640 may also comprise a calculation module 652 for determining the extents of the relationship representation within a display. An adjustment module 654 may then reconfigure, including resize, the portion(s) (along with adjustments to the cards associated with each portion) over a given time period. By making such adjustments over the given time period, data associated with any cards may be obtained from the storage 630 and provided to the user device 610*a*, 610*b* as part of an update to the data indicative of the relationship representation without delay.

The controller 640 may also comprise a tracking module 656 for tracking each card in their respective in the relationship representation. For example, as a user interacts with the rendered relationship representation as described above, new cards may be added to a portion e.g., such as when a user scrolls through a list of cards that are displayed in a portion. In such an example, efficiencies may be obtained by deleting the data associated with each of the cards which are no longer displayed as part of the representation, from a local memory associated with the controller 640 and/or the user device 610*a*, 610*b*. This frees up resources, such as local memory and processing power for use by other tasks and/or applications.

Referring briefly back to FIG. 1, the storage 120 may be a solid-state drive (SSD) or other semiconductor-based RAM; a ROM, for example, a CD ROM or a semiconductor ROM; a magnetic recording medium, for example, a floppy disk or hard disk; optical memory devices in general, although it will be appreciated that other storage mediums may be used. The storage 120 may be accessed via a local area LAN, a WAN, and/or a public network (e.g., the Internet) via a network adaptor. The network adapter may be configured to communicate using either a wired or wireless communication method, such as cellular connectivity (LTE, 3G, 4G, or 5G), ethernet, or over a Wi-Fi network.

As described above, the digital environment may be operating on the user device 110 using a software program such as a web browser or other application installed on the user device 110 which facilitates the connection via the API 140, and is configured to render the relationship representation based on the generated data indicative of the relationship representation. By receiving the requests through the API 140, a generic interface with external devices can be used. This enables multiple different types of user devices, with different operating systems and requirements to interact with the system 100. By using a generic interface, interaction with the system 100 is simplified and access from different locations and using different devices with different hardware and/or software is enabled.

As explained above, the controller 130, 640 may be configured within a cloud computing environment. Cloud computing is a model for service delivery enabling on-demand network access to shared resources including processing power, memory, storage, applications, virtual machines, and services, that can be instantiated and released with minimal effort and/or interaction with the provider of the service. Cloud computing environments enable quick and cost-effective expansion and contraction of such resources by enabling the provisioning of computing capabilities, such as server time and network storage as needed. Cloud computing enables the service provider's resources to be pooled and to serve multiple consumers by dynamically assigning and reassigning physical and virtual resources on demand. Examples of such services include Amazon Web Service™ (AWS), Microsoft Azure, and Google Cloud Platform.

In cloud computing, a user of a SaaS application generally has no control or knowledge over where the provided resources are located or, in examples involving multiple service providers, which service provider is providing the resources. Access to the resources of the cloud computing environments is typically provided via a user account object which facilitates the user's interaction with the resources allocated to a given task within the cloud computing environment. It will be appreciated that other environments may be used, such as a collection of servers within a local area network (LAN).

At least some aspects of the embodiments described herein with reference to FIGS. 1-6 comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general, etc.

It is to be understood that although some of the disclosure above relates to the use of cloud computing, the implementation described is not limited to a cloud computing environment. Rather, embodiments of the present disclosure are capable of being implemented in conjunction with any other type of computing environment.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

Furthermore, it will be appreciated that references to "up", "down", "left", "right", "portrait", "landscape", "orientation", "rotation" or any other similar language described in connection with an example may refer to any other orientation, rotation, position, and/or location.

The above embodiments are to be understood as illustrative examples of the disclosure. Further embodiments of the disclosure are envisaged. For example, as noted above, the data set may be representative of a census database, where the individual data items within the database represent individual people and the associated relationships are representative of familial relationships such as a parent/child relationship. It will be appreciated that, in some examples, the data set may relate to data in a number of different categories.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method for generating data indicative of a relationship representation in a digital environment operating on a user device using a system, the system comprising:

storage for storing data, the data comprising at least a plurality of data items, each of the plurality of data items having associated relationship data indicative of at least one relationship between a given data item of the plurality of data items and at least one other data item of the plurality of data items; and a controller for managing at least some of the plurality of data items in the data;

the method comprising:

receiving, at the controller, a request for the relationship data associated with the given data item in the plurality of data items;

obtaining, by the controller, the at least one other data item of the plurality of data items based on the relationship data associated with the given data item;

generating, by the controller, the data indicative of the relationship representation, the data indicative of the relationship representation representing variable dimensions on a display of the user device, and comprising at least:

a first portion comprising a representation of the given data item and representations of one or more additional data items of the plurality of data items;

a second portion comprising a representation of the at least one other data item of the plurality of data items; and an indication of the relationship between the given data item and the at least one other data item of the plurality of data items, wherein the first portion and the second portion are reconfigurable between a first configuration and a second configuration in response to changes in the variable dimensions on the display, wherein in the first configuration the second portion is positioned adjacent to the first portion, and in the second configuration the second portion is positioned above or below the first portion and the first portion and the second portion are horizontally co-located within a common width and are vertically distributed; and wherein, in response to the changes in the variable dimensions, the representation of the given data item is maintained at a fixed position within the first portion and the representations of one or more of the one or more additional data items are removed from the first portion.

2. The method for generating data indicative of a relationship representation in a digital environment operating on a user device according to claim 1, further comprising recalculating, by the controller, a dimension of at least one of the first portion or the second portion, when a request for the relationship data associated with a chosen data item with a representation in the second portion is received at the controller.

3. The method for generating data indicative of a relationship representation in a digital environment operating on a user device according to claim 1, wherein the relationship data comprises temporal information.

4. The method for generating data indicative of a relationship representation in a digital environment operating on a user device according to claim 3, wherein the second portion is positioned within the dimensions specified in the data indicative of the relationship representation based on the temporal information of the relationship data associated with the given data item and the at least one other data item.

5. The method for generating data indicative of a relationship representation in a digital environment operating on a user device according to claim 1, further comprising:

calculating, by the controller, an end state for at least the first portion and the second portion, the end state comprising an end size and an end position within dimensions specified in the data indicative of the relationship representation; and resizing and repositioning, by the controller, at least the first portion and the second portion to the end size and the end position over a given time period.

6. The method for generating data indicative of a relationship representation in a digital environment operating on a user device according to claim 1, further comprising tracking, by the controller, at least the representation of at least the given data item, and the representation of the at least one other data item of the plurality of data items, within the data indicative of the relationship representation.

7. The method for generating data indicative of a relationship representation in a digital environment operating on a user device according to claim 1, wherein the first portion and the second portion are reconfigured in response to changes in available display width.

8. The method for generating data indicative of a relationship representation in a digital environment operating on a user device according to claim 1, wherein the data comprises any of:

patent data;
product data;
personally identifiable information;
census data; and
sports data.

9. A system for generating data indicative of a relationship representation in a digital environment, the system comprising:

a user device configured to operate the digital environment;

storage for storing data, the data comprising at least a plurality of data items, each of the plurality of data items having associated relationship data indicative of at least one relationship between a given data item of the plurality of data items and at least one other data item of the plurality of data items;

a controller for managing at least some of the plurality of data items in the data and configured to send and receive commands;

the controller comprising a processor configured to:

receive a request for relationship data associated with the given data item in the plurality of data items;

obtain the at least one other data item of the plurality of data items based on the relationship data associated with the given data item;

generate the data indicative of the relationship representation, the data indicative of the relationship representation representing variable dimensions on a display of the user device and comprising at least:

a first portion comprising a representation of the given data item and representations of one or more additional data items of the plurality of data items;

a second portion comprising a representation of the at least one other data item of the plurality of data items; and an indication of the relationship between the given data item and the at least one other data item of the plurality of data items, wherein the first portion and the second portion are reconfigurable between a first configuration and a second configuration in response to changes in the variable dimensions on the display, wherein in the first configuration the second portion is positioned adjacent to the first portion, and in the second configuration the second portion is positioned above or below the first portion and the first portion and the second portion are horizontally co-located within a common width and are vertically distributed; and wherein, in response to the changes in the variable dimensions, the representation of the given data item is maintained at a fixed position within the first portion and the representations of one or more of the one or more additional data items are removed from the first portion.

10. The system for generating data indicative of a relationship representation in a digital environment according to claim 9, wherein the processor is further configured to recalculate a dimension of at least one of the first portion or the second portion, when a request for the relationship data associated with a chosen data item with a representation in the second portion is received at the controller.

11. The system for generating data indicative of a relationship representation in a digital environment according to claim 10, wherein the processor is further configured to:

calculate an end state for at least the first portion and the second portion, the end state comprising an end size and an end position within dimensions specified in the data indicative of the relationship representation; and resize and reposition at least the first portion and the second portion to the end size and the end position over a given time period.

12. The system for generating data indicative of a relationship representation in a digital environment according to claim 11, wherein the relationship data comprises temporal information, and the end state is based on the temporal information.

13. The system for generating data indicative of a relationship representation in a digital environment according to claim 9, wherein the processor is further configured to track at least the representation of at least the given data item, and the representation of the at least one other data item of the plurality of data items, within data indicative of the relationship representation.

14. The system for generating data indicative of a relationship representation in a digital environment according to claim 9, wherein the first portion and the second portion are reconfigured in response to changes in available display width.

15. A non-transitory computer-readable storage medium comprising a set of computer-readable instructions stored thereon, which when executed by at least one processor are arranged to generate data indicative of a relationship representation in a digital environment operating on a user device using a system, the system comprising:

storage for storing data, the data comprising at least a plurality of data items, each of the plurality of data items having associated relationship data indicative of at least one relationship between a given data item of the plurality of data items and at least one other data item of the plurality of data items;

a controller for managing at least some of the plurality of data items in the data; and an application programming interface, API, configured to send and receive requests to and from the controller;

wherein the instructions, when executed cause the processor to:

receive, at the controller, a request, through the API, for the relationship data associated with the given data item in the plurality of data items;

obtain, by the controller, the at least one other data item of the plurality of data items based on the relationship data associated with the given data item;

generate, by the controller, the data indicative of the relationship representation, the data indicative of the relationship representation representing variable dimensions on a display of the user device, and comprising at least:

a first portion comprising a representation of the given data item and representations of one or more additional data items of the plurality of data items;

a second portion comprising a representation of the at least one other data item of the plurality of data items; and an indication of the relationship between the given data item and the at least one other data item of the plurality of data items, wherein the first portion and the second portion are reconfigurable between a first configuration and a second configuration in response to changes in the variable dimensions on the display, wherein in the first configuration the second portion is positioned adjacent to the first portion, and in the second configuration the second portion is positioned above or below the first portion and the first portion and the second portion are horizontally co-located within a common width and are vertically distributed; and wherein, in response to the changes in the variable dimensions, the representation of the given data item is maintained at a fixed position within the first portion and the representations of one or more of the one or more additional data items are removed from the first portion; and transmit the data indicative of the relationship representation from the controller, through the API.

16. A method for generating data indicative of a relationship representation in a digital environment operating on a user device using a system, the system comprising:

storage for storing data, the data comprising at least a plurality of data items, each of the plurality of data items having associated relationship data indicative of at least one relationship between a given data item of the plurality of data items and at least one other data item of the plurality of data items; and a controller for managing at least some of the plurality of data items in the data, the method comprising:

receiving, at the controller, a request for the relationship data associated with the given data item in the plurality of data items;

obtaining, by the controller, the at least one other data item of the plurality of data items based on the relationship data associated with the given data item;

generating, by the controller, the data indicative of the relationship representation, the data indicative of the relationship representation representative of variable dimensions on a display of the user device, and comprising at least:

a first portion comprising a representation of the given data item and representations of one or more additional data items of the plurality of data items;

a second portion comprising a representation of the at least one other data item of the plurality of data items; and an indication of the relationship between the given data item and the at least one other data item of the plurality of data items, wherein the first portion and the second portion are reconfigurable between a first configuration and a second configuration in response to changes in the variable dimensions on the display, wherein in the first configuration the second portion is positioned adjacent to the first portion, and in the second configuration the second portion is positioned above or below the first portion and the first portion and the second portion are horizontally co-located within a common width and are vertically distributed; and wherein, in response to the changes in the variable dimensions, the representation of the given data item is maintained at a fixed position within the first portion and the representations of one or more of the one or more additional data items are removed from the first portion; and transmitting the data indicative of the relationship representation from the controller.

* * * * *